(12) United States Patent
Barlow

(10) Patent No.: US 9,873,627 B1
(45) Date of Patent: Jan. 23, 2018

(54) MULTI-STAGE PORTABLE WATER PURIFIER WITH CLEANABLE AND REPLACEABLE INSERT CARTRIDGES

(71) Applicant: Michael M. Barlow, Naples, FL (US)

(72) Inventor: Michael M. Barlow, Naples, FL (US)

( * ) Notice: Subject to any disclaimer, the term of this patent is extended or adjusted under 35 U.S.C. 154(b) by 0 days.

(21) Appl. No.: 15/597,693

(22) Filed: May 17, 2017

(51) Int. Cl.
| | |
|---|---|
| *C02F 9/00* | (2006.01) |
| *C02F 1/00* | (2006.01) |
| *C02F 1/28* | (2006.01) |
| *C02F 1/44* | (2006.01) |
| *C02F 1/76* | (2006.01) |

(52) U.S. Cl.
CPC .............. *C02F 9/005* (2013.01); *C02F 1/002* (2013.01); *C02F 1/283* (2013.01); *C02F 1/444* (2013.01); *C02F 1/76* (2013.01); *C02F 2201/006* (2013.01)

(58) Field of Classification Search
CPC .......... C02F 1/002; C02F 1/283; C02F 1/444; C02F 1/76; C02F 9/005; C02F 2103/001; C02F 2103/007; C02F 2201/006; C02F 2303/02; C02F 2303/04; C02F 2303/185; B01D 61/145
USPC ........................................ 210/266, 282, 283
See application file for complete search history.

(56) References Cited

U.S. PATENT DOCUMENTS

| | | | |
|---|---|---|---|
| D256,719 S | 9/1980 | Rose | |
| 4,298,475 A * | 11/1981 | Gartner | ................ A47G 21/188 |
| | | | 210/266 |
| D288,115 S | 2/1987 | McCausland et al. | |
| D310,707 S | 9/1990 | Sedman | |
| 5,273,649 A | 12/1993 | Magnusson et al. | |
| 5,456,831 A | 10/1995 | Sullivan | |
| 5,545,315 A * | 8/1996 | Lonneman | ............... C02F 1/003 |
| | | | 210/120 |
| 5,580,447 A | 12/1996 | Platter et al. | |
| D400,755 S | 11/1998 | Ferlin, Jr. | |
| 6,120,686 A | 9/2000 | Bilz | |
| 6,599,428 B1 * | 7/2003 | Douglas | .................. C02F 1/281 |
| | | | 210/266 |
| 7,316,323 B2 | 1/2008 | Collias et al. | |
| 7,896,168 B2 | 3/2011 | Collias et al. | |
| 8,119,012 B2 | 2/2012 | Bahm et al. | |
| 8,318,011 B2 | 11/2012 | O'Brien et al. | |
| 8,425,771 B2 | 4/2013 | O'Brien et al. | |
| D718,414 S | 11/2014 | Lo | |
| D723,135 S | 2/2015 | Haslem | |

(Continued)

OTHER PUBLICATIONS

Water 101—Hollow Fiber Membrane—What Is It?, Aug. 2014, Renovo Water, retrieved on Jun. 26, 2017. Retrieved from the internet, <URL:http://renovowater.com/water101/HF_blog1/>, pp. 1-3.*

(Continued)

*Primary Examiner* — Matthew O Savage
(74) *Attorney, Agent, or Firm* — Edward M. Livingston, Esq.; Bryan L. Loeffler, Esq.; Livingston Loeffler, P.A.

(57) ABSTRACT

A lightweight, portable, on-contact and on-demand, straw-style, high flow rate water purifying apparatus, tested and proven by an accredited and certified laboratory to meet or exceed Environmental Protection Agency (EPA) and NSF/ANSI P231 and 53 standards for a microbiological water purifier. The apparatus includes a shell and a hollow, elongated chamber that accommodates cleanable and replaceable water filtration and water purification media cartridges.

3 Claims, 12 Drawing Sheets

(56) References Cited

U.S. PATENT DOCUMENTS

| | | |
|---|---|---|
| D740,916 S | 10/2015 | Doi et al. |
| D741,982 S | 10/2015 | Maeng |
| 2004/0112826 A1 | 6/2004 | Chiba |
| 2008/0105618 A1 | 5/2008 | Beckius |

OTHER PUBLICATIONS

MUV Adaptable Water Filter, Renovo Water, May 2016, retrieved on Jun. 26, 2017. Retrieved from the internet, <URL:http:renovowater.com/index.php/muv>, pp. 1-8.*

Wayback Machine, retrieved on Jun. 27, 2017. Retrieved from the internet, <URL: http://web.archive.org/web/*/http://renovowater.com/index.php/muv>, pp. 1-3.*

U.S. Appl. No. 15/050,791, filed Feb. 23, 2016 (28 pages).

\* cited by examiner

MULTI-STAGE PORTABLE WATER PURIFIER WITH CLEANABLE AND REPLACEABLE INSERT CARTRIDGES

RELATED APPLICATIONS

U.S. patent application Ser. No. 15/050,791, filed on Feb. 23, 2016.

TECHNICAL FIELD

This invention relates to a compact, lightweight, portable, on-contact and on-demand, water purification device with cleanable and replaceable filtration and media cartridges. Independent testing results of the device by an accredited and certified laboratory establishes that its performance exceeds Environmental Protection Agency (EPA) standards, as well as NSF/ANSI P231 and 53 standards. Specifically, the water purification device of the invention meets or exceeds the requirements of a microbiological water purifier in that it achieves at least a 6 Log 10 (>99.9999) removal or kill of bacteria; a 4 Log 10 (>99.99) removal or kill of viruses; and a 4 Log 10 (>99.99) removal or kill of waterborne cysts, such as *Giardia* and *Cryptosporidium*.

The apparatus may be used in many ways. Specifically the apparatus may be hand-held and activated by mouth suction. Alternatively, the apparatus may be used with hydration backpacks that are activated by mouth suction. In yet another embodiment, the apparatus may be used with gravity-feed source water containers. In a still further embodiment, the apparatus may attached to a hand-powered water pump accessory.

The apparatus of the invention purifies non-saline contaminated water from lakes, streams, ponds, other surface water sources, wells, cisterns, and rainwater. The apparatus will remove particulates and protozoa, such as *Giardia* and *Cryptosporidium*, on-contact and on-demand, as water that includes such particulates and protozoa passes through a first insert cartridge. This first insert cartridge is designed to fit snugly into a first chamber, to prevent the contaminated water from bypassing the first insert cartridge.

After the water exits the first insert cartridge in the first chamber it goes directly into the second insert cartridge that fits snugly into the second insert chamber to prevent water from bypassing the second insert cartridge, killing water borne bacteria and viruses, and removing other pathogens, on-contact and on-demand before exiting the apparatus.

BACKGROUND OF THE INVENTION

Uncontaminated potable water is essential to all animal and plant life. In most environments, ample supplies of potable water are readily available for residential, commercial, and agricultural purposes.

However, in many areas of the world, and during natural disasters and emergencies, available water may contain contaminants such as waterborne bacteria, viruses and cysts. These contaminants present serious health risks to persons who would drink such untreated, available water. In addition, persons who are living or working outside of established urban or rural communities, including hikers, outdoorsmen, travelers, and soldiers, may also experience shortages of potable water. In all such cases, there is a need for a portable, lightweight, reusable, device that can be used by one or more persons to immediately and easily purify water that contains potentially harmful microbiological contaminants.

Various types of portable water filters and water purification devices are known, including many straw-like devices. The user may place his mouth over one end of the device, so that he can draw and ingest the water. The other end of the device is immersed in the water source. The user sucks water upward through the device, in the same manner as with a conventional drinking straw, causing the water to pass through the device and contact one or more filtration media.

Some of the known water filter devices include those shown and described in United States Patent Application Publication Nos. 2004/0112826 to Chiba and 2008/0105618 to Beckius. One known water purification device is shown in U.S. Pat. No. 8,318,011. While these devices are said to be generally suitable for their purposes, there appears to be a market demand for a new, proven and tested water purification device that overcomes functional limitations of the devices.

For example, a significant limitation with such prior art, water filtering and purification devices relates to the pore size (measured in microns) required to exclude various and/or specific contaminants from passing through the filter media. Expressed in simple terms, the smaller the pore size of the filtration media, the more microbial and other contaminants will be removed from the water passing through the filter media.

Conventional straw-type water filter devices can only be designated as water filters and cannot be designated as water purifiers. This is because the minimum pore size that allows a user to practically and easily move the water upward through the water filter by mouth suction (0.05 microns) is small enough to trap waterborne bacteria and cysts, but not small enough to trap waterborne viruses. And the ability to trap waterborne viruses is an EPA and NSF/ANSI requirement for a device that may be designated as a water purifier, rather than a water filter.

Similarly, hand-held or gravity feed water purifiers that use filtration media with a pore size capable of trapping waterborne viruses (0.02 microns or less) require gravity feed pressure or pump pressure to move the contaminated water through the small pore sized filtration media. Therefore, while such devices can and do meet water purifier standards, they cannot be used as a straw, or with a hydration backpack that require mouth suction.

A potential health problem arises with such water filters in general, as well as water purifiers that rely on small pore size to trap waterborne viruses and contaminants. Particularly, water filters and small-pored purifiers trap contaminants, allowing contaminant-free potable water to exit such devices. However, the contaminants removed by the filters or purifiers, including bacteria, viruses and cysts, are trapped by and remain within the device. This raises the potential of the on-going growth of these remaining contaminants in the wet and often warm environment of the filter or purifier.

Additionally, smaller pore size filters become clogged more easily and therefore will become quickly ineffective with high sediment water. As a result, unless their filters can be readily changed or cleaned, such devices must be replaced with a new device as soon as they become clogged. The need to maintain a supply of such replacement devices can be extremely problematic in disasters, emergencies and in emerging nations. It is preferable to have access to a device that is maintenance-free over long periods of time and with the ability to clean large amounts of contaminated water.

Known portable water purifiers relying on small pore size to exclude waterborne viruses have other shortcomings.

Such water purifiers need rely upon gravity feed pressure or pump pressure to move the contaminated water through the filtration media having these small pores, and thus suffer from relatively slow flow rates.

Other types of water filtering and water purifying devices are known, but they are typically inconvenient to operate, requiring set-up or preparation time, or are bulky to carry and operate, and are therefore not truly portable.

The inventor has identified the numerous problems associated with existing portable water filtering and water purifying devices. As a result of over twenty-five years of commercial experience with personal and portable water purifiers, as well as a significant amount of experimentation, the inventor has now developed a straw-style water purification apparatus that overcomes the limitations of prior art water filters and water purifiers.

SUMMARY OF THE INVENTION

The invention is a lightweight, high flow rate, on-contact and on-demand microbiological water purification device, with cleanable and replaceable filter and purification media insert cartridges.

In the meaning of this specification, "on-contact" means that the water can pass through the device without delay, i.e., as fast as the user can pull the water through the device by suction. In other words, there is no need for the contaminated water to have a "residence time" within the device in order for the device to effect purification.

In the this specification, "on-demand" means that the device can be deployed instantaneously, without the need for any kind of set-up or preparation.

The device is preferably of a straw-style type, i.e., of an elongated, hollow cylindrical shape. The device is pocket sized, so as to make it easily portable. The device includes cleanable and replaceable filtration and purification media cartridges.

Most significantly, the water purification apparatus of the invention has been established by independent testing to exceed EPA as well as NSF/ANSI P231 and 53 standards. Thus, the water purification apparatus of the invention is a true microbiological water purifier.

The present water purification apparatus may be used by one person in the manner of a drinking straw. Alternatively, the invention may be used by multiple users, without the risk of cross-contamination, with either a hydration backpack, gravity feed attachments, or pump action accessories.

The apparatus includes a shell and a hollow, elongated chamber, and is in this way generally shaped like, and may be used in the manner of, a drinking straw. The bottom of the apparatus includes a first opening. The first opening enables the ingestion of contaminated water into the bottom of the apparatus; and then into and through the hollow, elongated chamber of the device; and then into and through the entire device.

The apparatus and its elongated chamber also include a second opening at the top of the apparatus, through which purified water is removed from the chamber.

Purification of the contaminated water drawn into the apparatus is effected by water filtration and purification media. In the broadest structure of the invention, any number of media may be used. While two or more media may be used, the preferred embodiment of the invention includes five filters or filter media and one purification media.

Specifically, the preferred media includes the following five filters or filter media: one (1) ultrafiltration membrane, specifically having a pore size of between 0.05-0.10 microns; two (2) polypropylene filter discs, each with a pore size of one millimeter; one (1) polypropylene filter pad with a pore size of 200 microns; and one (1) granulated, activated carbon filter media.

The preferred purification media includes a halogenated resin (ViroBac™) developed by the inventor of the present apparatus, and available from Water One of Southwest Florida.

The preferred water purifying apparatus is divided into and is comprised of two parts or chambers. These two parts may be of different lengths, and may include a first lower chamber, and a second upper chamber. The structures that define and enclose the first lower chamber and the second upper chamber are releasably connected to each other, as with complementary male and female threads.

The first lower chamber includes a first removable insert cartridge, specifically designed to fit easily but snugly into the first lower chamber. The first removable insert cartridge includes a first O-ring that prevents bypassing of the contaminated source water between that cartridge and the walls of the first lower chamber. In this way, the first O-ring helps to ensure that all of the contaminated source water passes through the first removable insert cartridge.

The second upper chamber includes a second removable insert cartridge, specifically designed to fit easily but snugly into the second upper chamber. The second removable insert cartridge includes a second O-ring that prevents bypassing of the contaminated source water between that cartridge and the walls of the second upper chamber. In this way, the second O-ring ensures that all of the contaminated source water passes through the second removable insert cartridge.

The first removable cartridge contains the ultrafiltration membrane.

The second removable cartridge contains the two (2) filter discs. These filter discs are heat sealed at both ends of the second removable cartridge. The second removable cartridge also contains the filter pad; the halogenated resin; and the granulated, activated carbon.

In yet another aspect of the invention, both the first removable cartridge in the first lower chamber, and the second removable cartridge in the second upper chamber, may be cleaned in place. This may be done with the apparatus of the invention in its fully assembled condition, i.e., with the two removable cartridges remaining inserted within their respective chambers, and with the structure defining those chambers secured together by their respective complementary male and female threads.

This clean-in-place process may be accomplished in any of several ways. First, the clean-in-place process can be effected by blowing air by mouth through the second opening at the top of the apparatus, and down though the length of the apparatus.

Second, clean water can be passed by gravity flow or hand pump pressure through the second opening at the top of the apparatus, and out the first opening at the bottom of the apparatus.

Either of these two methods is effective in removing sediment and solids that can clog the apparatus, or slow the rate of water flow through the apparatus.

BRIEF DESCRIPTION OF THE DRAWINGS

Preferred embodiments of the invention are shown in the accompanying drawings.

DETAILED DESCRIPTION

Figure 1:
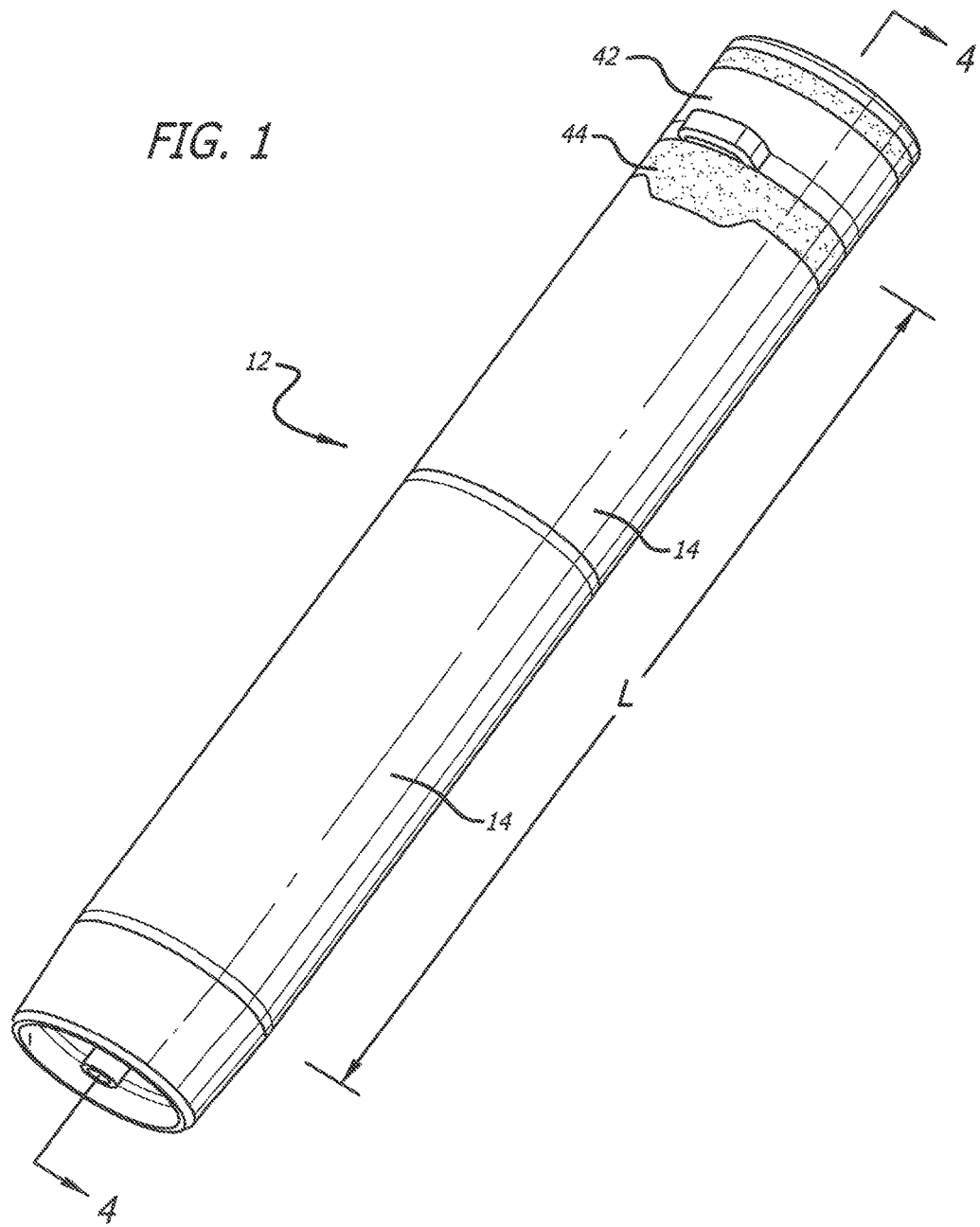
FIG. 1 is a perspective view of the preferred embodiment of the invention, with its top protective cap in place.

As may best be seen in FIG. 1, the invention is a portable water purifying apparatus 12. In a general sense, the apparatus 12 is shaped and may be used in the manner of a drinking straw. It this embodiment, the apparatus 12 has an overall length of approximately nine (9) inches, and a diameter of approximately one and one-half (1½) inches.

Figure 4:
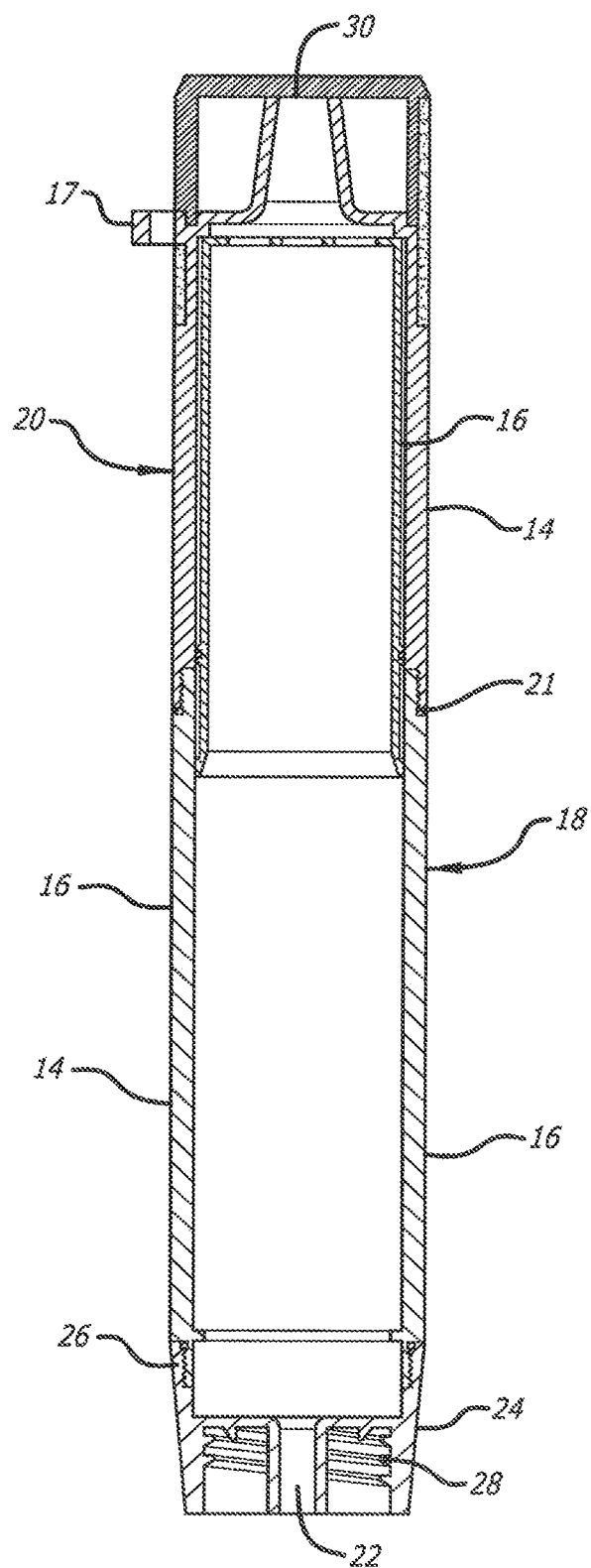
FIG. 4 is a cross-sectional view taken along lines 4-4 of FIG. 1, showing various internal components of the apparatus of FIG. 1.

As may be seen in FIGS. 1 and 4, the apparatus 12 has an outer shell 14, and a generally hollow interior within that outer shell 14. The outer shell 14 is made from a hard, durable food grade polymer or plastic. A preferred plastic is acrylonitrile butadiene styrene (ABS). As may be seen in FIG. 4, this outer shell 14 defines a hollow, elongated inner chamber 16 that goes nearly from one end of the apparatus 12 to the other end of the apparatus 12. As will be explained in more detail below, this hollow, elongated inner chamber 16 will serve to house and snugly contain two replaceable cartridges.

Figure 2:
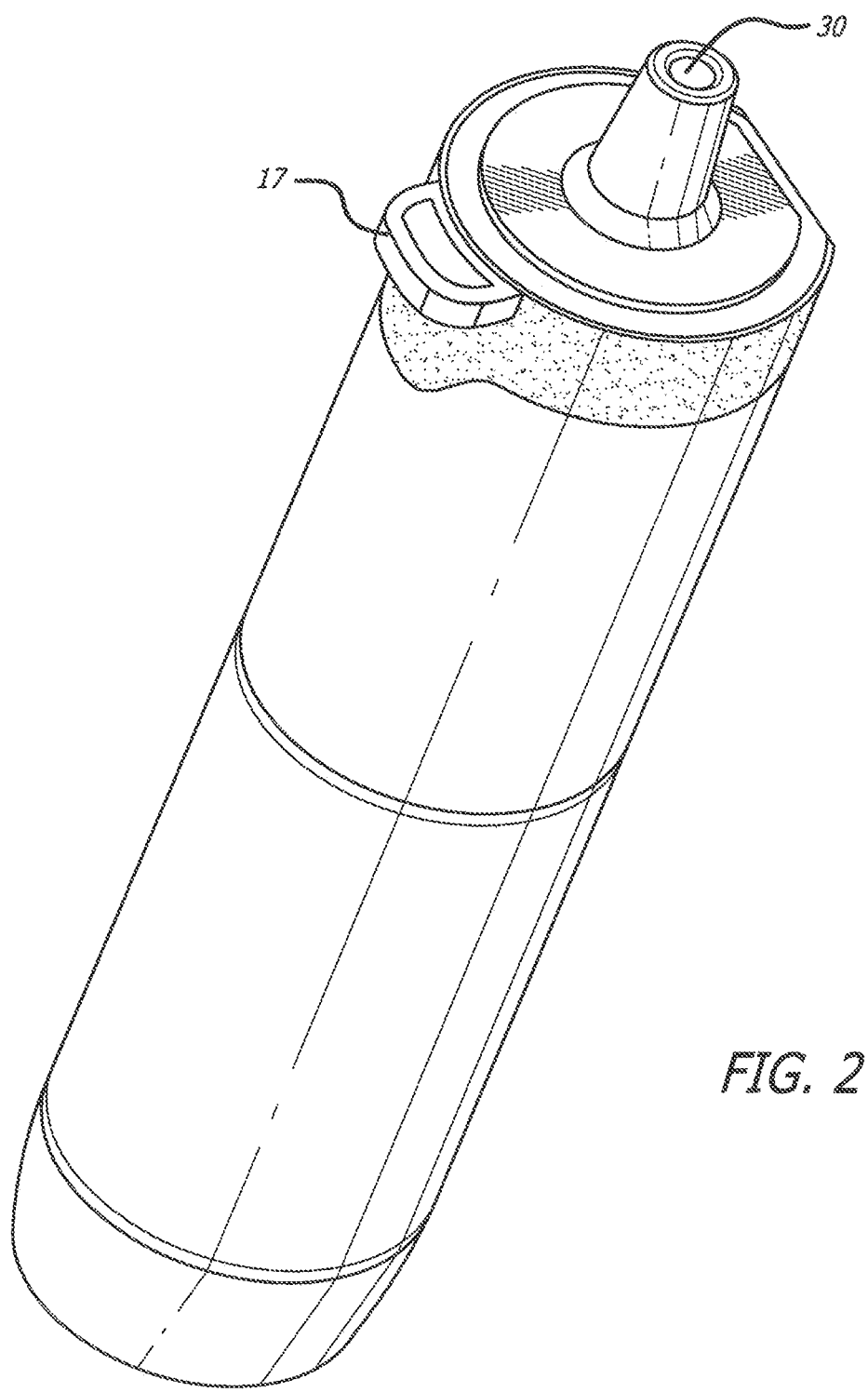
FIG. 2 is another perspective view of the embodiment of FIG. 1, taken from a different angle, and with its top, protective cap removed.
Figure 3:
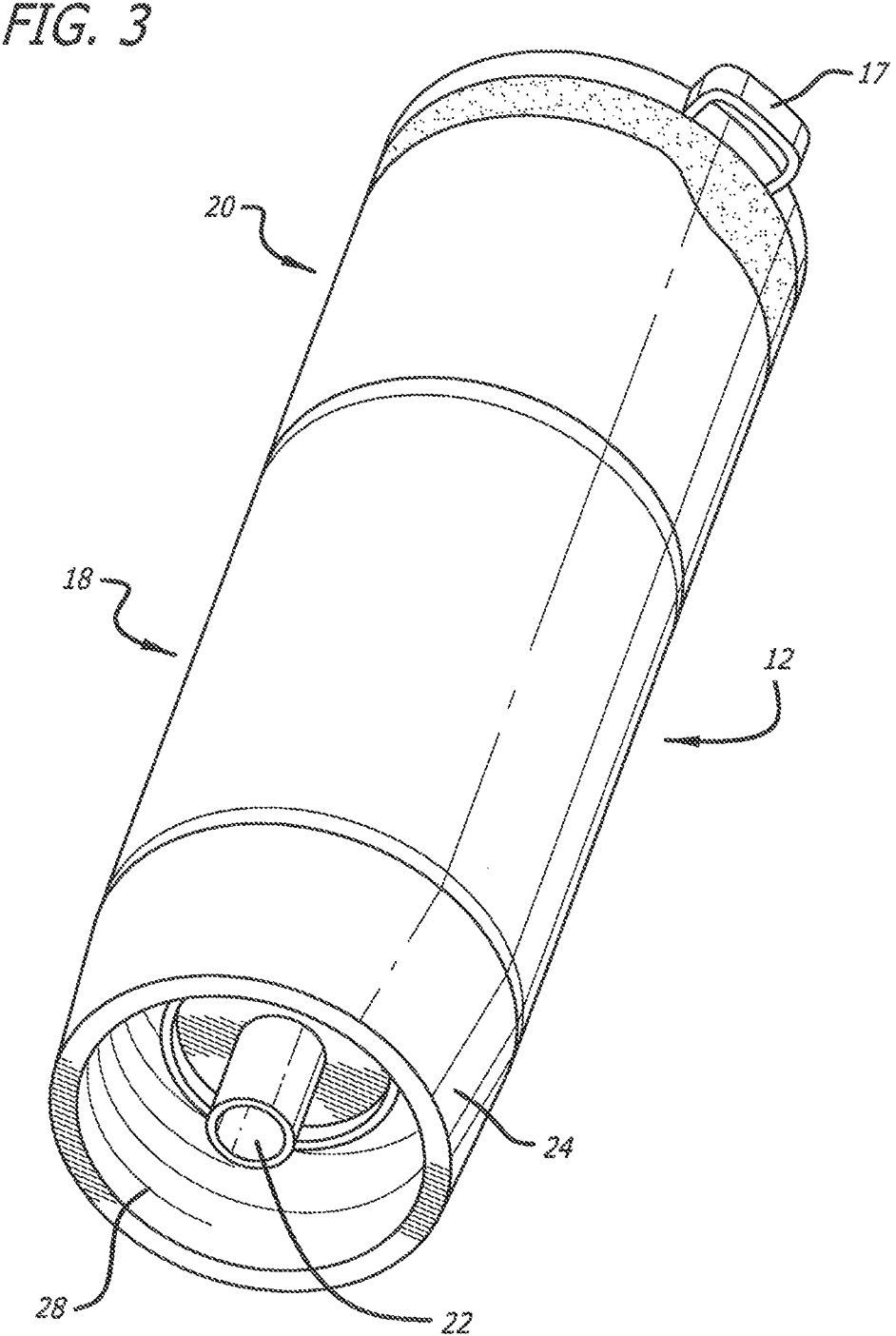
FIG. 3 is lower perspective view of the embodiment of FIG. 1, showing in more detail the intake port through which contaminated water enters the device.

As may best be seen in FIGS. 2, 3, and 4, the apparatus 12 also includes a loop or eyelet 17. A lanyard, string, or other similar element may be secured to this eyelet 17. In this way, the user can place the lanyard or string around his neck, for convenient carrying and to reduce the likelihood of losing the apparatus 12. Alternatively, for safe storage, the lanyard or string can be placed on a backpack or wrapped around a hook.

In general, the description in this specification will use "top" or "upper" and "bottom" or "lower" to describe the orientation and relative position of components when the apparatus 12 is used in the manner of a drinking straw. This is the manner of use for the apparatus 12 in the configuration depicted in FIGS. 1-4 of the drawings. For clarity, the top of the apparatus 12 is adjacent element 30 in FIG. 4, and the bottom of the apparatus 12 is adjacent element 22 in FIG. 4.

As may be seen in FIG. 1, the outer shell 14 extends along a substantial portion of the length of the apparatus 12. The length L of the outer shell 14 is shown in FIG. 1. As will be explained in more detail below, and as may be seen in FIG. 4, the hollow, elongated chamber 16 is essentially a single chamber 16. However, for purposes of this description, the chamber 16 may be formed by or divided into two separate but not equal portions, i.e., a first lower chamber 18 and a second upper chamber 20.

Figure 11:
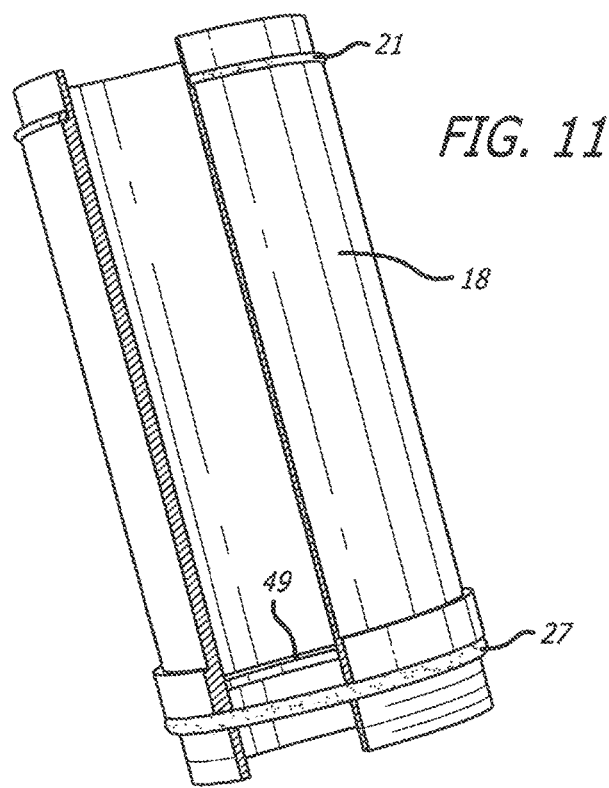
FIG. 11 is a perspective, partial cutaway view of the first lower chamber.

The structures defining the first lower chamber 18 and second upper chamber 20 may be secured to each other with complementary threads. As may be seen in FIG. 11, to prevent or inhibit leakage, an o-ring 21 is positioned on the first lower chamber 18. When the structures forming the first lower chamber 18 and second upper chamber 20 are secured together, this o-ring 21 creates a water-tight seal between those structures.

The length of the first lower chamber 18 and the length of the second upper chamber 20 combine to form, and are essentially equal to the length of, the hollow, elongated chamber 16. In this embodiment, the outer shell 14 essentially defines the outer periphery of the elongated chamber 16, and also essentially defines the outer periphery of both the first lower chamber 18 and the second upper chamber 20.

As may be seen in FIGS. 3 and 4, the apparatus 12 includes a first opening 22. Typically, this first opening 22 is positioned at the bottom of the apparatus 12, and is in communication with the hollow, elongated chamber 16. It is through this first opening 22 that contaminated water may be drawn into the chamber 16. In the embodiment shown in these Figures, and as may be seen in FIGS. 3 and 4, the first opening 22 is an integral part of, and is formed by, a dual-threaded, bottom intake cap 24.

Figure 13:
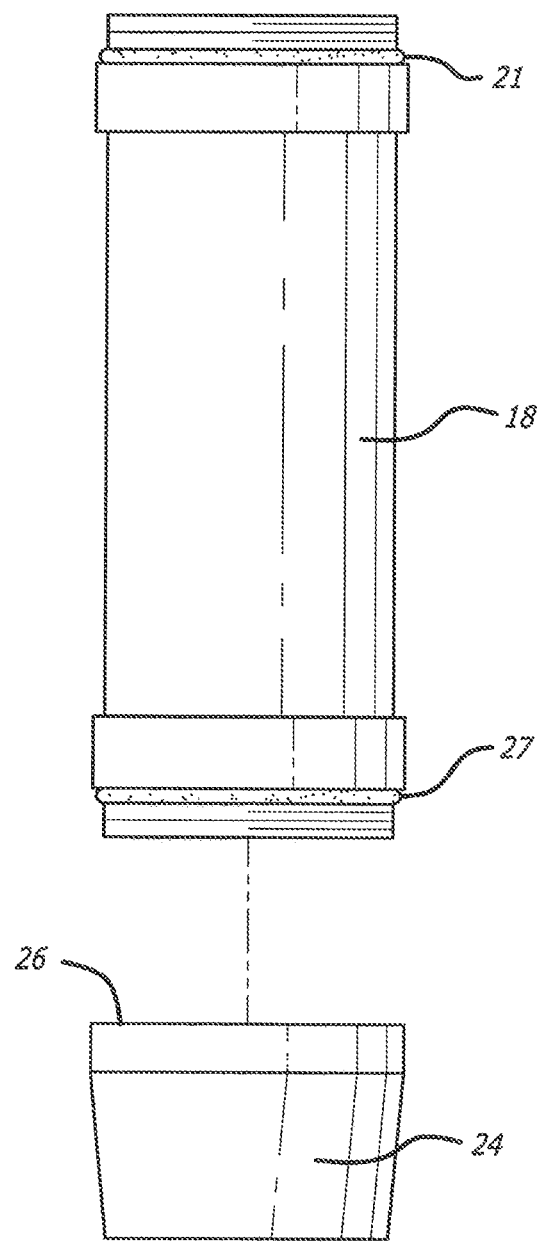
FIG. 13 is a perspective view of the bottom intake cap of FIGS. 1-3, disassembled from the first lower chamber.
Figure 14:
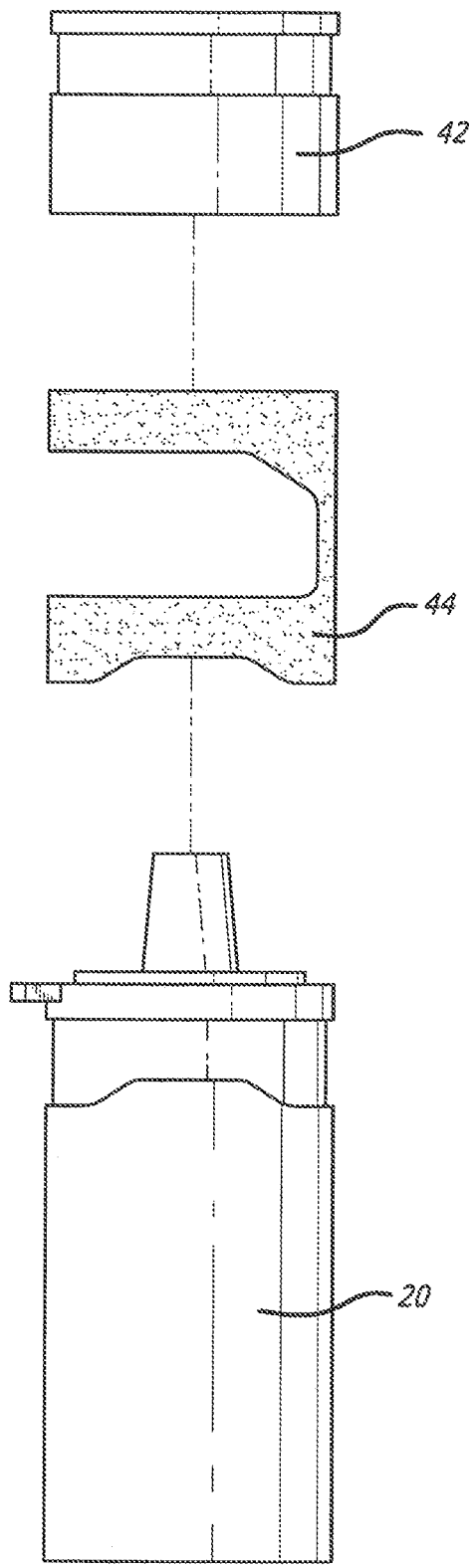
FIG. 14 is an exploded view of the second upper chamber, cap, and cap band of FIG. 1

As may be seen in FIGS. 4 and 13, the internal threads 26 of the bottom intake cap 24 are used to secure that cap 24 to the structure that forms and defines the first, lower chamber 18. As may be seen in FIGS. 11 and 13, that structure may include a conventional o-ring 27, to inhibit leakage between the lower chamber 18 and the adjacent cap 24.

Referring now to FIGS. 3 and 4, the lower external threads 28 of the bottom intake cap 24 may be used to secure to that cap 24 either containers holding contaminated water, or pumps.

Contaminated water is brought into the apparatus 12 through the first opening 22. As it passes through the apparatus 12, it is filtered and purified. As may be seen in FIGS. 2 and 4, the filtered and purified water is discharged from the apparatus 12 and its hollow, elongated chamber 16 through a second opening 30. When the apparatus 12 is used in the manner of a conventional drinking straw, i.e., in the orientation shown in FIGS. 1-4, this second opening 30 serves as a mouthpiece, and as the exit port for the purified water. When the apparatus 12 is used in the manner of a drinking straw, the second opening 30 is located at the top of the apparatus 12.

Purification of the contaminated water drawn into the portable water purifying apparatus 12 of the invention is accomplished by its passage through water purification media. One or two such media can be used in this apparatus 12. However, the preferred embodiment of the invention includes five filters or filter media, and one proprietary purification media.

Specifically, the five filters or filter media include: one (1) ultrafiltration membrane, with a preferred pore size of between 0.05-0.10 microns; two (2) polypropylene filter discs, with a preferred pore size of one millimeter; one (1) polypropylene filter pad with a pore size of 200 microns; and one (1) granulated, activated carbon filter media.

The proprietary purification media is a halogenated resin, developed by the inventor, and available from Water One of Southwest Florida.

Most specifically, the water passes through these six elements in the apparatus 12 in the following order: (i) ultrafiltration membrane, contained within the first removable lower cartridge; (ii) polypropylene filter disc; (iii) proprietary halogenated resin; (iv) polypropylene filter pad; (v) granulated activated carbon; (vi) polypropylene filter disc.

Figure 5:
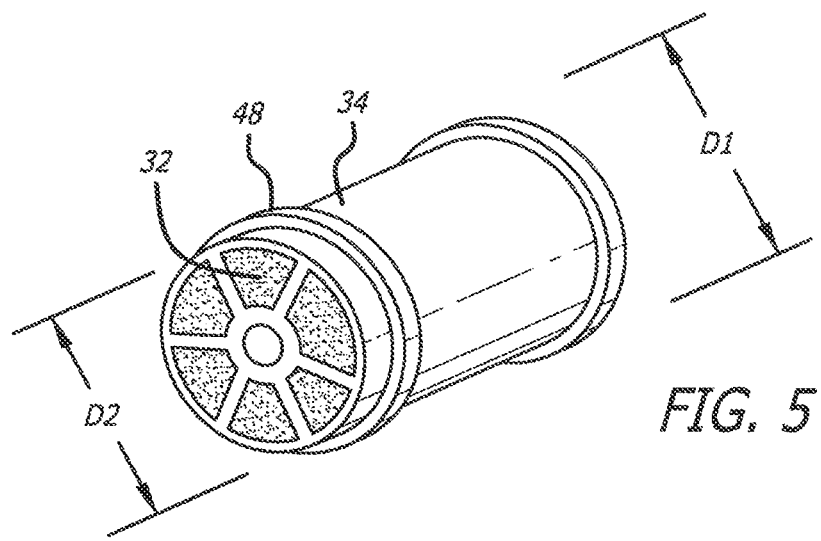
FIG. 5 is a perspective view of the first removable cartridge, as viewed from its water intake end, and depicting the ultrafiltration membrane that is substantially housed in the first removable cartridge and in the first lower chamber of the apparatus.
Figure 6:
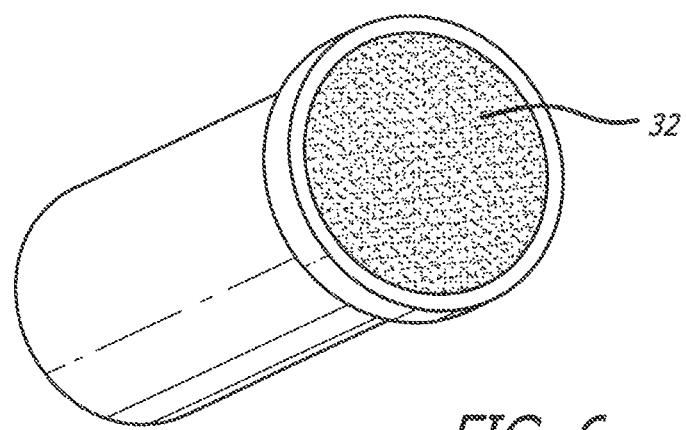
FIG. 6 is another perspective view of the first removable cartridge of FIG. 5, but as viewed from its water discharge end.

In this embodiment, the ultrafiltration membrane 32 is shown in FIGS. 5 and 6. Particularly, the ultrafiltration membrane 32 of FIGS. 5 and 6 is shown contained within first, removable cartridge 34. In this embodiment, the first, removable cartridge 34 is secured and housed within the first lower chamber 18 of the apparatus 12.

Figure 12:
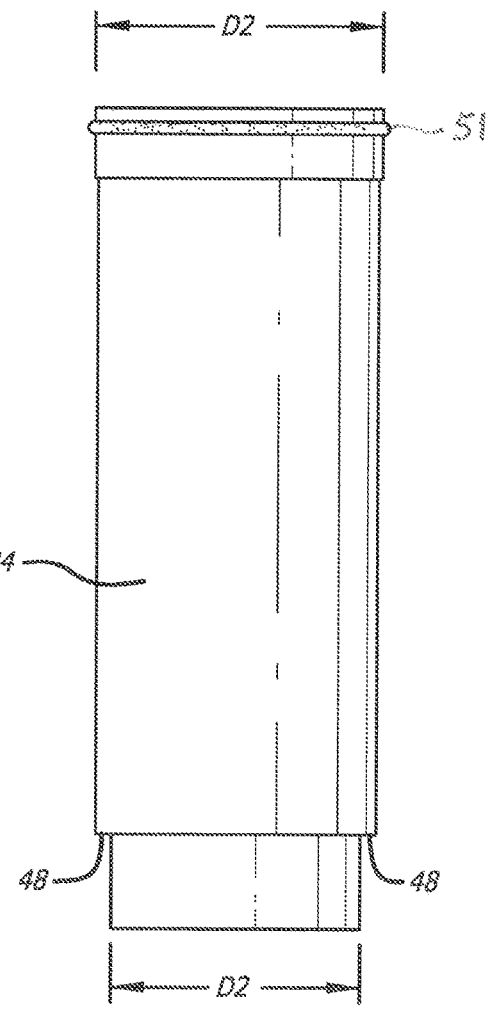
FIG. 12 is a side view of the first removable cartridge of FIG. 5.

As may be seen in FIGS. 5 and 12, the outer casing of the first removable cartridge 34 has two diameters. The upper portion of the first removable cartridge 34 has a diameter D1. The lower portion of the first removable cartridge 34 has a diameter D2. Here, the upper portion has a diameter D1 of approximately 1⅛". The lower portion is smaller, and has a diameter D2 of approximately 1¹⁄₁₆." As may also be seen in FIGS. 5 and 12, as a result of these differences in diameter, a ring-shaped lip 48 is formed at the junction of the upper and lower portions of the first removable cartridge 34.

Figure 7:
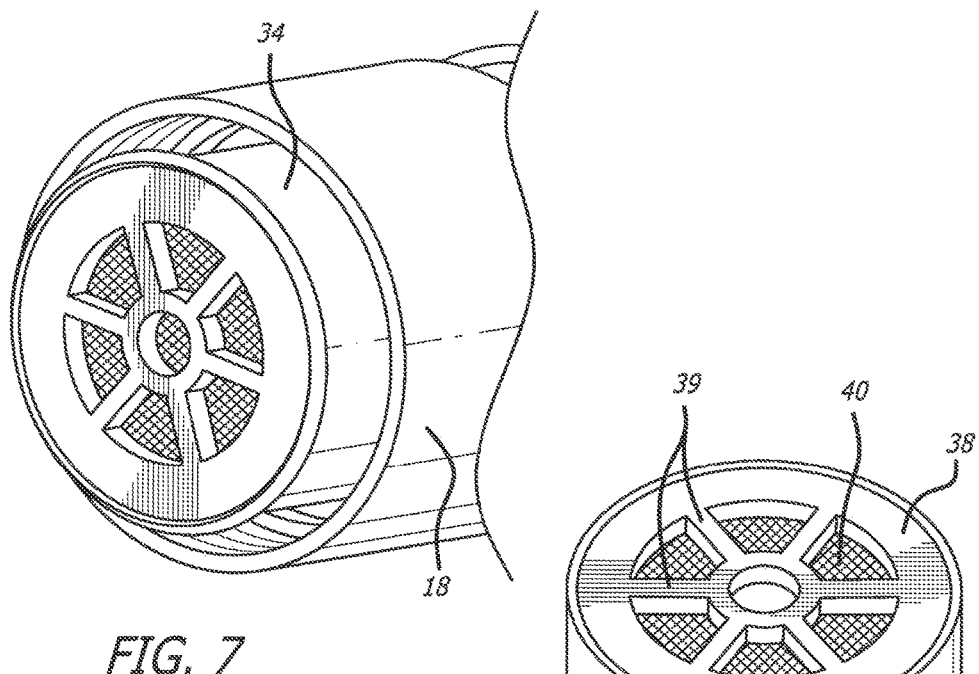
FIG. 7 is a perspective view of the first removable cartridge of FIGS. 5 and 6, and secured in place within the structure defining the first lower chamber.

FIG. 7 shows the first removable cartridge 34 of FIGS. 5 and 6, but inserted within the first lower chamber 18. To position the first removable cartridge 34, the cartridge 34 is placed in concentric alignment with and adjacent the top of the first lower chamber 18, and pushed down into that chamber 18. The outer wall of the cartridge 34 is sized to create a close friction fit with the inner wall of the first lower chamber 18. As the removable cartridge 34 is pushed down into the first lower chamber 18, its lip 48 ultimately reaches, and is stopped by, a ring-shaped flange 49. As may be seen in FIG. 11, that flange 49 is formed on the inner wall of the first lower chamber 18.

Referring again to FIG. 5, the ultrafiltration membrane 32 contained within the first removable cartridge 34 can be of any suitable type, but must be FDA approved for use with water or foods, i.e., it should be of a food grade standard. In this embodiment, the preferred ultrafiltration membrane 32 is a 0.10 micron polysulfone ultrafiltration membrane, that when used in the apparatus, allows a flow rate for the purified water of up to 500 ml per minute, and is available from Miniwell Outdoor Equipment Co., Ltd., of Guangzhou, China. It is believed to be comprised of elongated, hollow strands.

The ultrafiltration membrane for use in the present invention has a very specific orifice size. As noted above, the ultrafiltration membrane 32 of the invention has orifices of approximately 0.10 micron. The preferred range of the orifice size in the membrane is 0.05 to 0.10, or 0.05 to 0.12 micron. Another preferred range of the orifice size is 0.06 to 0.11 micron. A still further preferred range of the orifice size is 0.07 micron to 0.10 micron.

The size of orifices is important. Smaller orifice sizes will trap additional pathogens and contaminants, beyond those that are desirably trapped by the apparatus of the invention. The trapping of these pathogens and contaminants would lead to premature plugging of the apparatus and its ultrafiltration membrane. This would result in the need to change the membrane or the apparatus more frequently than desired.

In addition, smaller orifice sizes would restrict the rate of flow through the apparatus, and make it difficult for the user to draw water through the apparatus in a normal sucking manner.

Thus, the use of the ultrafiltration membrane with the range of these preferred orifice sizes filters out only those pathogens and contaminants required, while providing long life to the apparatus, and providing a relatively robust flow rate through the apparatus.

During manufacture, the strands of the ultrafiltration membrane 32 are inserted into an open end of the first removable cartridge 34. Particularly, the membrane 32 is inserted by folding the strands over each other. This folding of the ultrafiltration strands creates a generally cylindrical plug that substantially fills the interior of the first removable cartridge 34. The plug is of adequate diameter, so that it presses tightly on the inner walls of the first removable cartridge 34, and is glued in place to prevent bypassing of the water around the ultrafiltration membrane. The flow of the water penetrates the ultrafiltration membrane from the outside, in.

To ensure that all of the water that flows through the apparatus 12 is initially filtered by the ultrafiltration membrane 32, the outer perimeter of this cylindrical plug is adhered to the inner wall of the first removable cartridge 34. The adhesive keeps this cylindrical membrane plug in place, and fills in any spaces between the perimeter of the cylindrical plug and the inner wall of the first removable cartridge 34. In this way, the adhesive creates a seal and ensures that substantially all contaminated water flows through the ultrafiltration membrane 32. Particularly, by the use of this adhesive, the water is inhibited from passing between the outer perimeter of the membrane plug and the inner wall of the first removable cartridge 34.

Any suitable food safe, water-proof adhesive that is compatible with the polysulfone ultrafiltration membrane and the ABS plastic of the apparatus may be used.

Virtually all water filtration media have a limited life, and must eventually be replaced, or discarded. In this case, the inventor's apparatus has been designed to be used with insert cartridges that can be quickly and easily replaced, allowing the apparatus to be used for many years. A replacement for the first removable cartridge 34, including its glued cylindrical ultrafiltration membrane plug, may be obtained from Water One of Southwest Florida, Inc., of Fort Myers, Fla.

In this embodiment, the ultrafiltration membrane 32 can extend the life of both the halogenated resin and the activated, granulated carbon and prevents the filter discs and filter pad from plugging and slowing the flow rate of the water passing through the apparatus. The ultrafiltration membrane 32, with the range of orifices discussed above, does this by providing most of the filtering of the contaminated water. Specifically, the ultrafiltration membrane 32 removes *cryptosporidium, Giardia*, pathogens, and some bacteria. It typically will not remove smaller elements, such as viruses. This also eases the cleaning load on the subsequent media, i.e, the halogenated resin and the granulated, activated carbon, and thereby also prevents the filter discs and the filter pad from plugging prematurely.

In this embodiment, the first removable cartridge 34 and its ultrafiltration membrane 32 are contained within the first lower chamber 18. In this way, and because of its design that includes an O-ring 51, any contaminated water being drawn through the bottom of the apparatus 12 is first contacted by the ultrafiltration membrane 32, without the water by-passing the ultrafiltration membrane.

In contrast, the filter discs and filter pad, the proprietary halogenated resin and granulated, activated carbon are contained or substantially contained within the second upper chamber 20.

Figure 8:
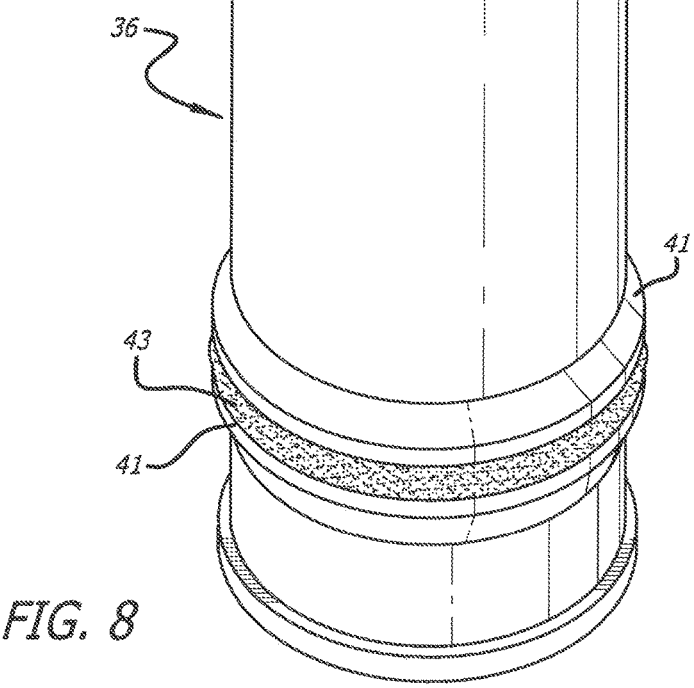
FIG. 8 is a perspective view of the second removable cartridge.
Figure 15:
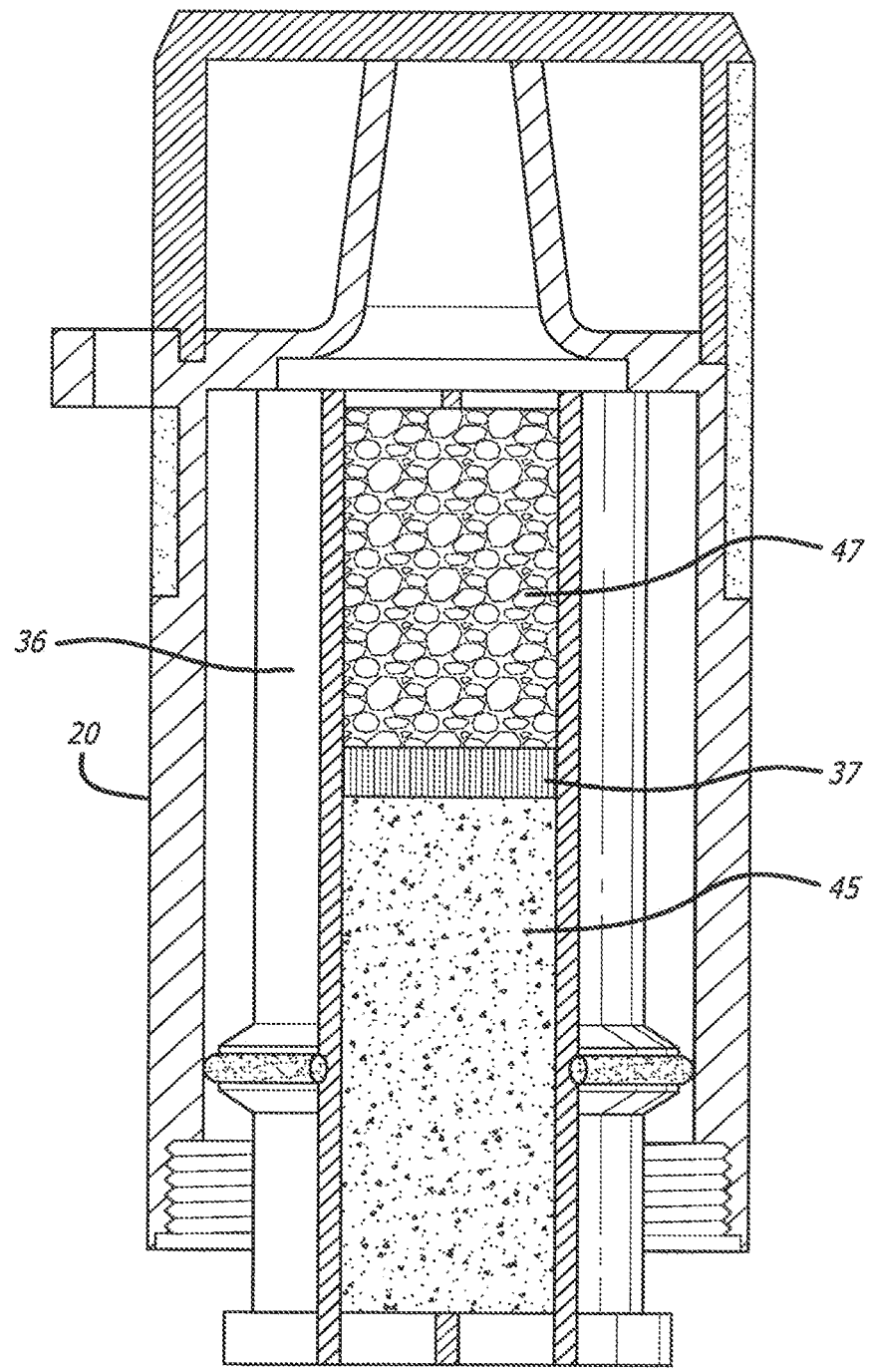
FIG. 15 is a perspective, partially cutaway view of the second upper chamber, with the second removable cartridge inserted in place for use within the apparatus.

The second removable cartridge 36 shown in FIGS. 8 and 15 contains both the two filter discs, the filter pad, the proprietary halogenated resin and the granulated, activated carbon. In the second removable cartridge 36 shown in FIGS. 8 and 15, the halogenated resin is separated from the granulated, activated carbon by a 200-micron polypropylene filter pad 37.

As may be seen in FIG. 8, the upper end of the second removable cartridge 36 includes a plurality of spokes 39. These spokes 39 provide that upper end with structural rigidity, while also permitting water to pass through that upper end, and out of the second removable cartridge 36. The interior of the upper end of this cartridge 36 includes a circular, filter disc 40 adjacent the spokes 39 and secured by heat sealing.

This filter disc 40 has a preferred opening size of 200 mesh or smaller. The preferred material of this filter disc 40 is polypropylene, but it may be also made of another food grade material. The purpose of this filter disc 40 is to prevent small, breakaway pieces of the halogenated resin from escaping from the second removable cartridge 36 and from the apparatus 12.

Figure 9:
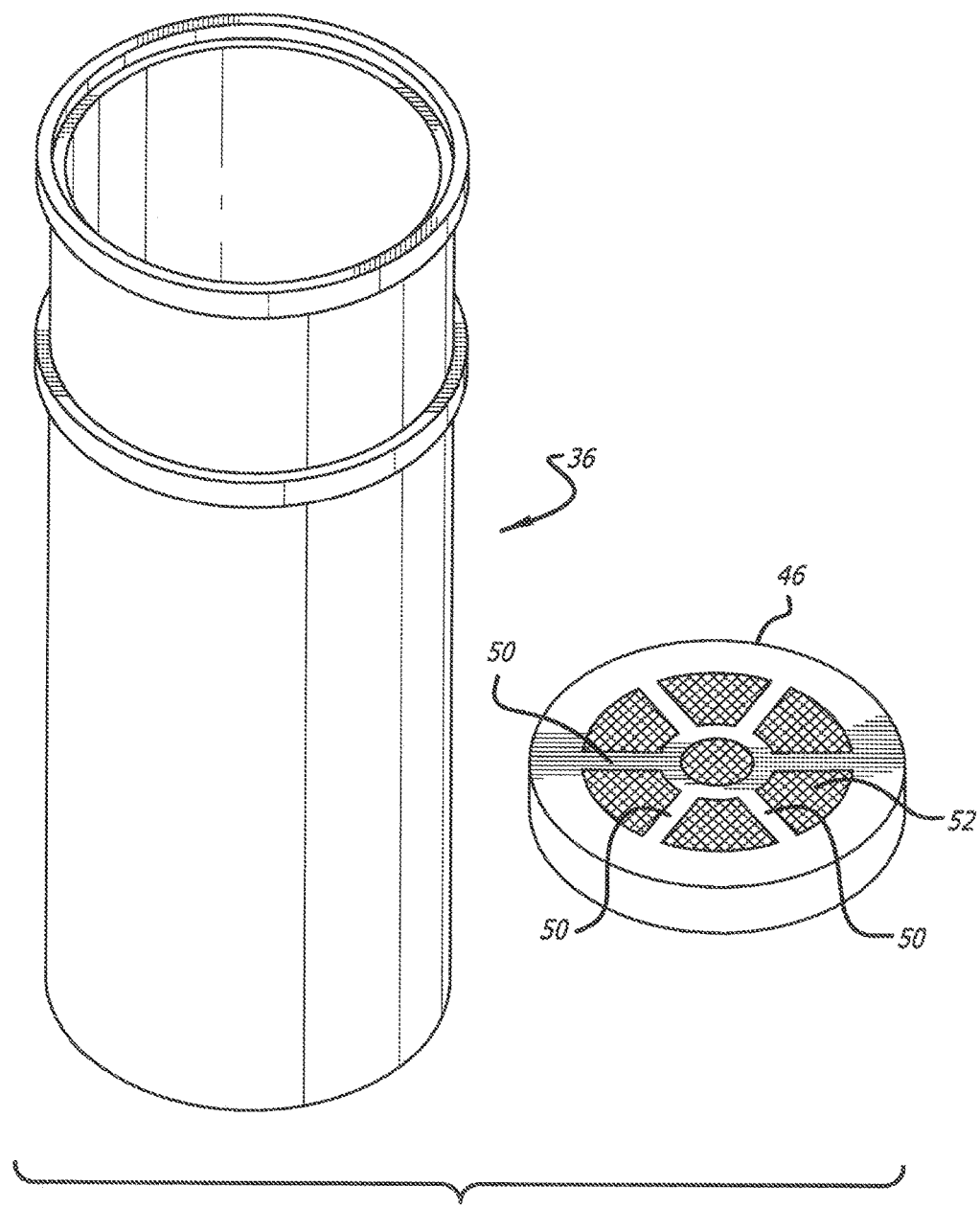
FIG. 9 is a perspective view of the second removable cartridge, but inverted from the position depicted in FIG. 8.
Figure 10:
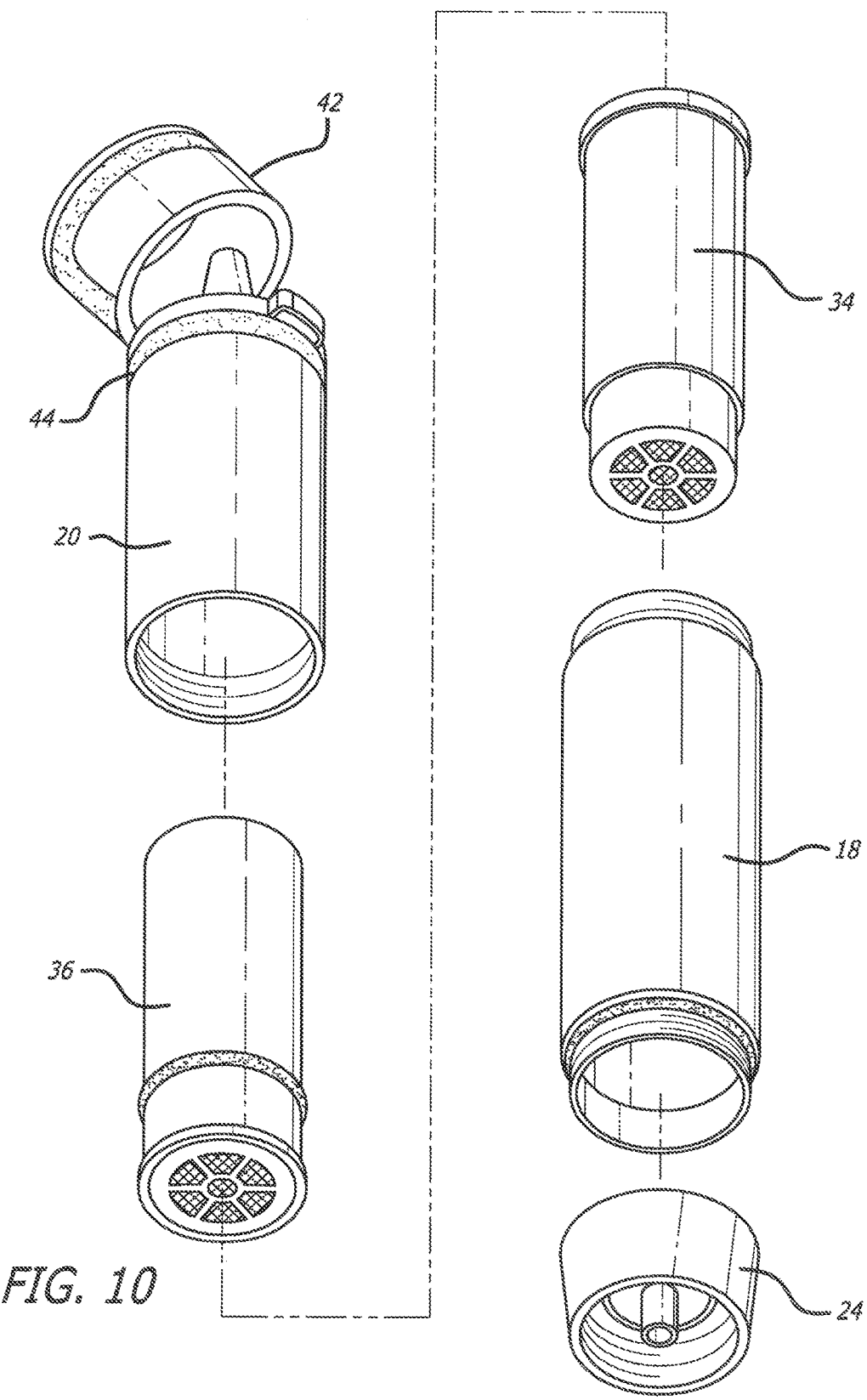
FIG. 10 is an exploded view of the apparatus shown in FIGS. 1-3.

Referring now to FIG. 9, the second removable cartridge 36 of FIG. 8 has been inverted. In this way, the top of FIG. 9 shows the initially open lower end of the second removable cartridge 36. The water filtration media can be inserted into the interior of the cartridge 36 through this open, lower end.

After the media have been inserted into the interior of the cartridge 36, its lower end is closed by overcap 46, which is also shown in FIG. 9. In a manner similar to the integrally formed structure at the top of the cartridge 36, the overcap 46 includes six spokes 50. The function of these spokes 50 is to provide structural rigidity to the overcap 46, while permitting the flow of water into the bottom of the second removable cartridge 36. A circular filter disc 52, like that described above, is secured to the interior of the overcap 46 by heat sealing.

In addition, the overcap 46 is dimensioned and formed so that it can be securely press-fit onto the bottom, open end of the second removable cartridge 36. Installing the overcap 46 onto the open end of the second removable cartridge 36 completes the assembly of that cartridge 36, and places the cartridge 36 in condition for use within the apparatus 12.

As noted above, this second removable cartridge 36 preferably contains the two filter discs, the filter pad, the proprietary halogenated resin and the granulated, activated carbon.

Any of a number of halogenated resins may potentially be used for the invention. However, different halogenated resins will have variations in the amount of iodine residual that can be detected in the water that passes though these resins. Here, the preferred halogenated resin is Virobac™ resin, a proprietary resin developed by the inventor of the present apparatus. Independent laboratory testing, by an accredited and certified laboratory, has confirmed that there is no iodine residual detectable in the water that passes through the apparatus when ViroBac™ is used in the preferred embodiment of the apparatus. Virobac™ resin is available in replacement second removable cartridges 36 from Water One of SW Florida, Inc., Fort Myers, Fla.

Similarly, any number of granulated, activated carbons may be used for the invention. The most preferred granulated, activated carbon is available from Active Manufacturing, Cape Coral, Fla., with a 20×40 mesh size or smaller.

The granulated, activated carbon is essentially a finishing media. The ultrafiltration membrane and the halogenated resin have done most of the decontamination of the water before that water ever reaches the granulated, activated carbon. Essentially all that is left for the granulated, activated carbon is to remove any residual colors and odors from the water, so as to improve its taste.

In the assembled device 12, the second removable cartridge 36 of FIG. 8 is installed and contained within the second upper chamber 20. To position the second removable cartridge 36, it is placed in concentric alignment with and adjacent to the bottom of the second upper chamber 20, and pushed upwardly into that chamber 20. Two flared portions 41 and an intermediate o-ring 43 on the outer wall of the cartridge 36 are sized to create a close friction fit with the inner wall of the second upper chamber 20 ensuring that no water can bypass the second removable cartridge 36. As the second removable cartridge 36 is pushed up into the second upper chamber 20, the top end of that cartridge 36 reaches to limit of its travel within the second upper chamber 20. At that point, the cartridge 36 is securely seated within the second upper chamber 20 and available for use in the apparatus 12.

The present apparatus 12 is of the "on-contact, on-demand" type. By this, it is meant that water moves quickly from the first opening 22 to the second opening 30, killing bacteria and viruses without the need for residence time within the apparatus 12. Because of its unique design, the apparatus can be used like a straw with mouth suction, or with a hydration backpack by mouth suction, since the apparatus's ability to purify water is not limited by filtration pore size. In contrast, the prior art, using a filter pore size small enough to eliminate virues (0.02 micron or smaller) could not be used as a straw-type water purifier device requiring mouth suction or with a hydration backpack requiring mouth suction.

In operation, the user draws water through the apparatus 12 in any of a number of ways. As noted above, one way of moving water through the water purifier is by using it in the manner of a drinking straw. Particularly, referring now to FIG. 1, the user removes the cap 42 from the top of the apparatus 12 In order to prevent its loss in the field or elsewhere, the cap 42 is tethered to the apparatus 12 with an elastic cap band 44, in much the same way that a automobile's gas cap is tethered to its fuel filler neck.

As may be seen by a comparison of FIGS. 1 and 2, removal of the cap 42 exposes the second opening or mouth piece 30 of the apparatus 12. To operate the apparatus 12, the user simply places the first opening 22 of the bottom intake cap 24 into the contaminated water. The user then places his mouth over the mouthpiece 30, and draws on the mouthpiece 30, in substantially the same way that a user would draw upon the top of a drinking straw.

As suggested above, there are other ways of using the apparatus 12. The internal threads 28 of bottom intake cap 24 have a standard, 28 mm opening. A collapsible bag made of vinyl or other pliable, waterproof material with complementary, standard 28 mm threads may be filled with contaminated water. The collapsible bag is then secured to the internal threads 28. The apparatus 12 and collapsible bag assembly may then be turned upside down. The contaminated water will feed through the apparatus 12 at a rate of approximately 500 ml per minute. When the water leaves the apparatus 12 through the second opening 30, it will be purified. The advantage of securing the collapsible bag to the apparatus, and inverting the two, is that the user may observe the water as it leaves the second opening 30. This provides the user with a visual check of the clarity of the water—something that is not possible if the water is ingested directly from the mouthpiece 30, as when the apparatus 12 is used in the manner of a drinking straw. This method also has the advantage of enabling the collection of water into a large container, so that it may be used later, or accessed by a number of people. This eliminates the need for a water purifying apparatus 12 for each person in a group since the apparatus has been designed to be used by more than one person without the risk of cross contamination.

There is yet another way to use the inverted purifier apparatus 12. A two-liter or larger source water, gravity feed, hydration bladder may be secured to a tree or other supporting platform. The source water gravity feed bladder is then connected to the first opening 22 by attaching a flexible, collapsible hose or tube between the bag and the first opening 22. The hose or tube includes a hydration bladder tube clip that is normally in a closed position, i.e., pinching on and preventing water from escaping through the collapsible hose or tube.

A user who wants purified water merely opens the clamp. At that point, water will be able to flow freely from the collapsible bag, into the first opening 22, through the purifier 12, out through the second opening 30, and into a glass, pot, or other receptacle being held by the user. When adequate water has been removed by this user, the clamp is closed so that it again pinches the collapsible hose, preventing water from escaping. The unit is now ready to provide purified water to the next user by repeating the steps described above.

The apparatus 12 may also be used with a hand pump. The hand pump moves water from a contaminated water source and through the purifier 12. One manner of using the hand pump is to secure it to an intake hose. The intake hose includes a pre-filter, and a bobber-like flotation device to prevent clogging and contact of the pre-filter with the potentially muddy bottom of the water source.

As the user manually activates the hand pump, contaminated water from the water source is moved by the pump through the intake hose, into first opening 22, through the apparatus 12, and then out through the second opening 30.

Finally, the apparatus 12 may be used with a hydration backpack, such as a camelback-type. Normally, such hydration backpacks are used for containing and dispensing clean water through a discharge hose. One end of this discharge hose is attached to the backpack, and the other end of the hose dispenses clean water to the user.

In contrast, if the hydration backpack contains contaminated water, that water must be purified before being ingested by the user. In this case, the user would cut the discharge hose in the hydration backpack. The apparatus 12 would then be placed between the cut portions of the discharge hose. Another feature of the invention allows the discharge hose in the hydration backpack to be reconnected by a ¼-inch hose barb connector when the hydration backpack is not being used with the apparatus.

In operation, the contaminated water from the hydration backpack would move through the end of the cut hose nearest that backpack, and then enter the first opening 22. The contaminated water would move through the apparatus 12, and exit the apparatus from the second opening 30, as purified water. From the second opening 30, the purified water would move through the portion of the cut hose farthest from the hydration backpack, and be available for ingestion by the user. The unique design of the apparatus allows the water to be purified (not just filtered) as it moves through the hydration backpack by mouth suction, because there is no filtration pore size restriction required to purify the water as there is with the prior art water filters.

Cleaning can extend the life of the purifier apparatus 12. One method of cleaning the purifier 12 is for the user to blow air through the top of the apparatus 12, i.e., through the second opening 30 and in a counter-flow direction.

Another method of cleaning the apparatus 12 is by the use of a hand pump. To clean in this manner, one end of a flexible tube or hose is attached to the pump. Next, the other end of the flexible tube or hose is attached to the second opening 30. Finally, the hand pump is activated by the user, so as to move either air or water through the apparatus 12 in the reverse direction, i.e., from the top to the bottom of the apparatus 12.

The preferred embodiment above includes a particular combination of media, i.e., (i) the ultrafiltration membrane with a particular pore size, such as a pore size of between 0.05-0.10 microns in the first insert cartridge that fits into the lower first chamber; and (ii) the proprietary halogenated resin, Virobac™, and the granulated, activated carbon in combination with two filter discs and the filter pad in the second insert cartridge that fits into the upper second chamber. In a second embodiment, the first and second removable insert cartridges can be filled with one or a combination of two or more filtration or purification medias, selected to address and resolve any one of a number of specific water contamination issues, such as but not limited to, lead, cadmium, mercury content, or radioactive contaminants etc.

What is claimed is:

1. An on-contact, on-demand portable water purifying apparatus, comprising:
   an outer shell defining a hollow, elongated chamber;
   a first opening in a bottom of said outer shell, for drawing contaminated water into the chamber;
   a second opening in a top of said outer shell, for removing purified water from that chamber;
   said elongated chamber has a first lower chamber defined by a lower portion of the outer shell that creates an inner wall of the first lower chamber;
   said elongated chamber has a second upper chamber defined by an upper portion of the outer shell that creates an inner wall of the second upper chamber;
   said first lower chamber is adjacent to said first opening;
   said second upper chamber is adjacent to said second opening;
   a first removable cartridge which is insertable into said first lower chamber;
   a second removable cartridge which is insertable into said second upper chamber;
   a friction fit being located between said first removable cartridge and the first lower chamber when said first removable cartridge is inserted into the first lower chamber;
   a friction fit being located between said second removable cartridge and the second upper chamber when said second removable cartridge is inserted into the second upper chamber;

said first removable cartridge contains an ultrafiltration membrane within its outer wall; and said second removable cartridge contains a halogenated resin and granulated activated carbon within its outer wall.

2. An on-contact, on-demand portable water purifying apparatus, comprising:

an outer shell defining a hollow, elongated chamber;

a first opening in a bottom of said outer shell, for drawing contaminated water into the chamber;

a second opening in a top of said outer shell, for removing purified water from that chamber;

said elongated chamber has a first lower chamber defined by a lower portion of the outer shell that creates an inner wall of the first lower chamber;

said elongated chamber has a second upper chamber defined by an upper portion of the outer shell that creates an inner wall of the second upper chamber;

said first lower chamber is adjacent to said first opening;

said second upper chamber is adjacent to said second opening;

a first removable cartridge which is insertable into said first lower chamber;

a second removable cartridge which is insertable into said second upper chamber;

said first removable cartridge having an outer wall with an O-ring located thereon to create a seal within the first lower chamber;

said second removable cartridge having an outer wall with an O-ring located thereon to create a seal within the second upper chamber;

said first removable cartridge contains an ultrafiltration membrane within its outer wall; and said second removable cartridge contains a halogenated resin and granulated activated carbon within its outer wall.

3. An on-contact, on-demand portable water purifying apparatus, comprising:

an outer shell defining a hollow, elongated chamber;

a first opening in a bottom of said outer shell, for drawing contaminated water into the chamber;

a second opening in a top of said outer shell, for removing purified water from that chamber;

said elongated chamber has a first lower chamber defined by a lower portion of the outer shell that creates an inner wall of the first lower chamber;

said elongated chamber has a second upper chamber defined by an upper portion of the outer shell that creates an inner wall of the second upper chamber;

said first lower chamber is adjacent to said first opening;

said second upper chamber is adjacent to said second opening;

a first removable cartridge which is insertable into said first lower chamber;

a second removable cartridge which is insertable into said second upper chamber;

an O-ring being located between said first removable cartridge and the first lower chamber;

an O-ring being located between said second removable cartridge and the second upper chamber;

said first removable cartridge contains an ultrafiltration membrane within its outer wall; and said second removable cartridge contains a halogenated resin and granulated activated carbon within its outer wall.

* * * * *